May 6, 1930.  S. B. BARDSLEY  1,757,159
FLOAT VALVE OPERATING MECHANISM FOR FLUSH TANKS
Filed July 4, 1927
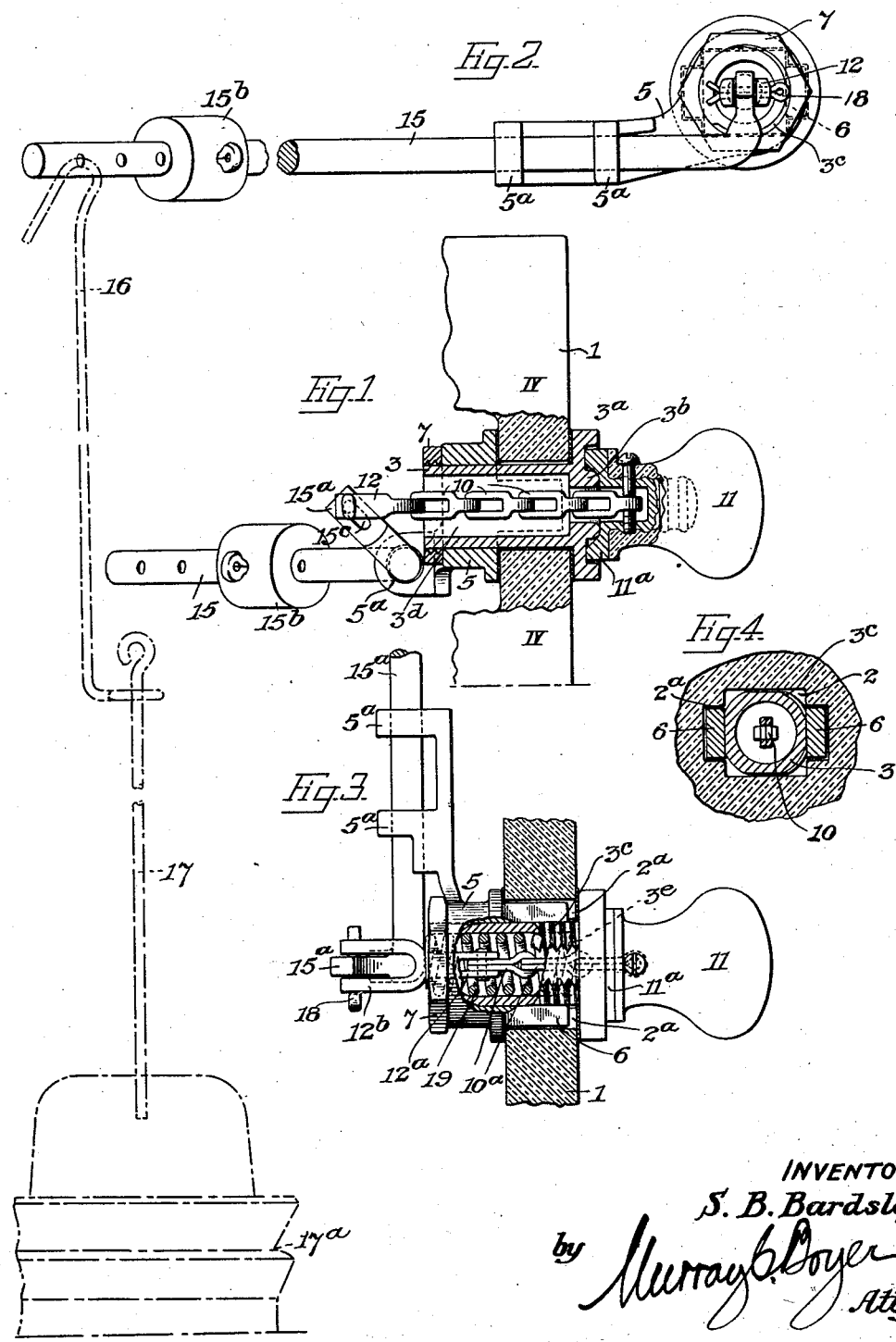
INVENTOR:
S. B. Bardsley,
by Murray B. Boyer
Atty.

Patented May 6, 1930

1,757,159

UNITED STATES PATENT OFFICE

SAMUEL BREWARD BARDSLEY, OF PHILADELPHIA, PENNSYLVANIA, ASSIGNOR TO WOODWARD-WANGER COMPANY, OF PHILADELPHIA, PENNSYLVANIA, A CORPORATION OF PENNSYLVANIA

FLOAT-VALVE OPERATING MECHANISM FOR FLUSH TANKS

Application filed July 4, 1927. Serial No. 203,284.

My invention relates to means for actuating the lever employed for operating the float valve of flush tanks, and one object of my invention is to provide a simple and efficient structure permitting operation of said lever by imparting upward or downward pressure, as the case may be, upon an operating knob normally projecting from the face of the tank.

A further object of my invention is to provide a structure of few parts and to mount the same in a manner that will permit operation with the greatest ease and efficiency.

These and other features of my invention are more fully described hereinafter; reference being had to the accompanying drawings, in which:

Figure 1 is a sectional elevation of my improved operating means for the float valve lever, shown in position in the wall of a flush tank.

Fig. 2 is a rear elevation of the same.

Fig. 3 is a sectional plan view illustrating a modified detail of my invention, and Fig. 4 is a sectional view on the line IV—IV, Fig. 3.

In the drawings 1 represents the front wall of a flush tank, which may be of any usual type and of any suitable material, wood, metal, vitreous material, or the like, having an aperture 2, to which may be applied a sleeve 3, having a flange $3^a$, provided with a concentric seat $3^b$. The aperture 2 may be squared and the sleeve 3 is of similar shape so as to be held against rotative movement with respect to the tank wall. This sleeve 3 receives at its rear or inner end a bracket 5, comprising a ring which fits over the squared or rectangular sleeve and is preferably provided with lateral extensions 6, fitting recesses $2^a$ at the sides of the opening 2, so as to be maintained in fixed position with respect to said sleeve and the wall of the tank. The sleeve 3 is threaded at $3^c$ for the reception of a retaining nut 7 whereby said sleeve together with the bracket 5 may be securely held in position with respect to the tank.

Within the bore $3^d$ of the sleeve 3, I mount a flexible member, preferably in the form of a suitable chain or the like, made up of links 10, the outer end of which chain is connected to a knob 11, while the inner end may be secured to a yoke member 12. The knob 11 may be made up of a metal portion $11^a$ receiving the knob proper of porcelain or other suitable material, vitreous or the like, and the inner end of the portion $11^a$ may be shaped to fit over the seat $3^b$, at the outer end of the sleeve 3.

The bracket 5 carried by the sleeve 3 is provided with bearing seats $5^a$ for a float valve lever 15, from the outer end of which the usual lever wire 16, for connection with the stem 17, of a float valve of any usual type, such as indicated at $17^a$, is suspended, while the inner end of said lever 15 may be disposed substantially perpendicular to the lever but rearwardly inclined as indicated at $15^a$, Fig. 1, and is connected to the yoke 12 by suitable means, such as a split pin 18. In the normal position, with the float valve indicated at 17 on its seat $17^a$, the lever 15 will rest with the extension $15^a$ in the position shown in Figs. 1 and 2. Under usual conditions the weight of the lever may be sufficient to impart the desired tension to hold the chain taut and maintain the knob 11 against the seat at the end of the sleeve 3, but to insure such tension I may provide the lever 15 with a small weight $15^b$, which may be adjustably mounted upon the end of the same adjacent to its connection with the lever wire 16. This weight may be retained in the desired position by means of a split pin which may pass through one of the apertures provided for the reception of the lever wire 16.

In lieu of the arrangement shown in Fig. 1, I may mount a flexible member within the bore $3^d$ of the sleeve 3, preferably in the form of one or more links $10^a$ connected at one end to the knob 11, and at the opposite end to a stem $12^a$, having a yoked end $12^b$, connected to the end $15^a$ of the lever 15. Between a shoulder $3^e$ of the sleeve 3 and the yoked end $12^b$ of the stem $12^a$, a coil spring 19 may be interposed to normally hold the knob 11 to its seat and project the yoked end of the stem $12^a$ within the tank; thereby maintaining the lever 15 in the inoperative position. Such arrangement is shown in Fig. 3, and when employed the weight 15$^b$, shown in Figs. 1 and 2, may be dispensed with.

When it is desired to raise the float valve from its seat, the knob 11 is rocked down or up, or to one side, as the case may be, and through the medium of the flexible connection the float valve lever will be rocked in its bearing seats of the bracket 5 against the tension imparted by the weight of said lever and/or the weight 15$^b$, or the tension of the coil spring, and raise the float valve from its seat in the usual manner. A straight axial pull imparted to the knob 11, as may be understood, will also operate the lever 15.

Upon releasing the knob, the float valve operating lever 15 will drop to its normal position; in the one case of its own weight assisted by the adjustable weight 15$^b$, and in the other instance assisted by the coil spring 19, permitting the float valve to return to its seat in the usual manner upon discharge of the water from the tank. In order that the substantially horizontal pull effected by operation of the knob 11 upon the flexible connection can effect proper movement of the float valve lever, the extension 15$^a$, may be slotted at 15$^c$, for free movement with respect to the split pin or other element 18, connecting the same with the yoke member 12, or the yoked end 12$^b$ of the stem 12$^a$.

I claim:

1. The combination of a sleeve secured to the wall of a flush tank, a lever, a fulcrum for the latter carried by said sleeve, a flexible connection passing thru said sleeve for actuating said lever, an operating member disposed externally of the tank and secured to said flexible connection, said operating member being mounted for rocking movement relative to said sleeve, and means for imparting tension to said flexible connection to return the lever and operating member to inoperative position.

2. The combination of a sleeve secured to the wall of a flush tank, a lever, a fulcrum for the latter carried by said sleeve, a flexible connection for actuating said lever and disposed in said sleeve with an operating member therefor disposed outside the tank, said operating means being mounted for axial and rocking movements relative to said sleeve, and means for imparting tension to said flexible connection to return the lever and operating member to inoperative position.

3. The combination of a sleeve secured to the wall of a flush tank, a lever, a fulcrum for the latter carried by said sleeve, a flexible connection passing thru the sleeve for actuating said lever, a handle secured to said flexible connection and mounted on said sleeve for rockable engagement therewith, and tension means for returning said flexible connection to inoperative position.

4. The combination of a sleeve secured to the wall of a flush tank in fixed position, a bracket carried by said sleeve, means carried by said bracket for holding the same in fixed position with respect to the sleeve, a lever journaled in said bracket, a flexible element disposed in said sleeve and connected to said lever, a knob secured to the opposite end of said flexible element; said knob being arranged to effect a pull upon said flexible element upon being displaced, and tension means acting upon said flexible element and lever for restoring said knob to its seat.

5. The combination of a sleeve secured to the wall of a flush tank, a bracket carried by the inner end of said sleeve, and having positioning means fitting an opening in the tank wall, a lever journaled in said bracket and having a cranked end, a flexible element disposed in said sleeve and connected to the cranked end of said lever, an operative handle secured to the opposite end of said flexible element; said handle being arranged to effect a pull upon said flexible element upon being displaced, and tension means acting upon said flexible element for restoring said handle to its seat.

6. The combination of a sleeve secured to the wall of a flush tank, a lever, a fulcrum for the latter carried by said sleeve, a flexible connection passing thru said sleeve for actuating said lever, an operating member disposed externally of the tank and secured to said flexible connection, said operating member being seated on said sleeve and mounted for rocking and axial movements relative thereto, and tension means operatively connected to said flexible connection for returning the same to inoperative position.

7. The combination of a sleeve secured to the wall of a flush tank, a lever fulcrumed with respect to said sleeve, a flexible connection for actuating said lever and disposed in said sleeve with an actuating member therefor outside the tank, and tension means for returning said flexible connection to inoperative position.

8. The combination of a sleeve secured to the wall of a flush tank, a bracket carried by said sleeve, a lever journaled in said bracket, a flexible element passing through said sleeve and connected to said lever, a knob secured to the opposite end of said flexible element; said knob being arranged to effect a pull upon said flexible element upon being displaced, and tension means for restoring said knob to its seat and permitting the lever to drop.

9. The combination of a sleeve secured to the wall of a flush tank, a bracket carried by the inner end of said sleeve, a lever journaled in said bracket and having a cranked end, a flexible element passsing through said sleeve including a yoke member connected to the cranked end of said lever, a handle secured to the opposite end of said flexible element; said handle being arranged to effect a pull upon said flexible element upon being displaced, and a weight adjustably mounted on said lever for imparting tension to said flexible element to restore said handle to its seat and assist the lever to drop to normal position.

10. The combination of a sleeve secured to the wall of a flush tank, a lever fulcrumed with respect to said sleeve, and having a cranked end, a flexible element passing through said sleeve and connected to the cranked end of said lever, an operative handle secured to the opposite end of said flexible element; said handle being arranged to effect a pull upon said flexible element upon being displaced, and spring tension means for restoring said hande to its seat and permitting the lever to drop to inoperative position.

11. The combination of a sleeve secured to the wall of a flush tank, a bracket carried by the inner end of said sleeve, a lever journaled in said bracket and having a cranked end, a flexible element passing through said sleeve including a yoke member connected to the cranked end of said lever, a handle secured to the opposite end of said flexible element; said handle being arranged to effect a pull upon said flexible element upon being displaced, and a coil spring for restoring said handle to its seat and assisting the lever to drop to normal position.

In witness whereof I have signed this specification.

S. BREWARD BARDSLEY.